(12) United States Patent
Child

(10) Patent No.: US 6,601,392 B2
(45) Date of Patent: Aug. 5, 2003

(54) SPRING MOUNTED RECUPERATOR

(75) Inventor: Malcolm S. Child, South Berwick, ME (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 0 days.

(21) Appl. No.: 09/968,111

(22) Filed: Oct. 1, 2001

(65) Prior Publication Data

US 2003/0061816 A1 Apr. 3, 2003

(51) Int. Cl.$^7$ .............................. F02C 7/10; F02C 7/20
(52) U.S. Cl. .................... 60/772; 60/39.511; 60/799
(58) Field of Search .................. 60/39.511, 39.5, 60/772, 799, 796, 797

(56) References Cited

U.S. PATENT DOCUMENTS

| | | | |
|---|---|---|---|
| 2,475,109 A | | 7/1949 | Pendleton |
| 2,801,519 A | * | 8/1957 | Wood ...................... 60/39.511 |
| 3,584,973 A | | 6/1971 | Lambiris |
| 3,791,142 A | * | 2/1974 | Caldarelli .................... 60/796 |
| 3,968,834 A | * | 7/1976 | Mangus et al. .......... 60/39.511 |
| 4,029,465 A | | 6/1977 | LaHaye et al. |
| 4,090,358 A | * | 5/1978 | Young ...................... 60/39.511 |
| 4,328,860 A | * | 5/1982 | Hoffmuller ................... 165/81 |
| 4,993,223 A | * | 2/1991 | Kretzinger ................ 60/39.511 |
| 5,274,997 A | * | 1/1994 | Inoue et al. ............. 60/39.511 |
| 6,276,124 B1 | | 8/2001 | Soh et al. |
| 6,307,278 B1 | * | 10/2001 | Nims et al. .............. 60/39.511 |
| 6,499,770 B1 | * | 12/2002 | Glista et al. ................ 285/223 |

FOREIGN PATENT DOCUMENTS

| | | |
|---|---|---|
| FR | 2198432 | 5/1972 |
| JP | 09100994 | 4/1997 |
| JP | 2001003708 | 1/2001 |
| WO | WO 0039441 | 7/2000 |

* cited by examiner

*Primary Examiner*—Ted Kim
(74) *Attorney, Agent, or Firm*—Michael Best & Friedrich LLP

(57) ABSTRACT

An apparatus for supporting the recuperator of a microturbine system in a vertical position above a turbine. The apparatus including a plurality of spring supports supporting the recuperator while simultaneously allowing thermal expansion of the turbine with a minimum amount of force being applied thereto. Thermal expansion of the turbine causes it to lift the recuperator while simultaneously decompressing the springs an amount equal to the amount of thermal expansion experienced by the turbine.

10 Claims, 2 Drawing Sheets

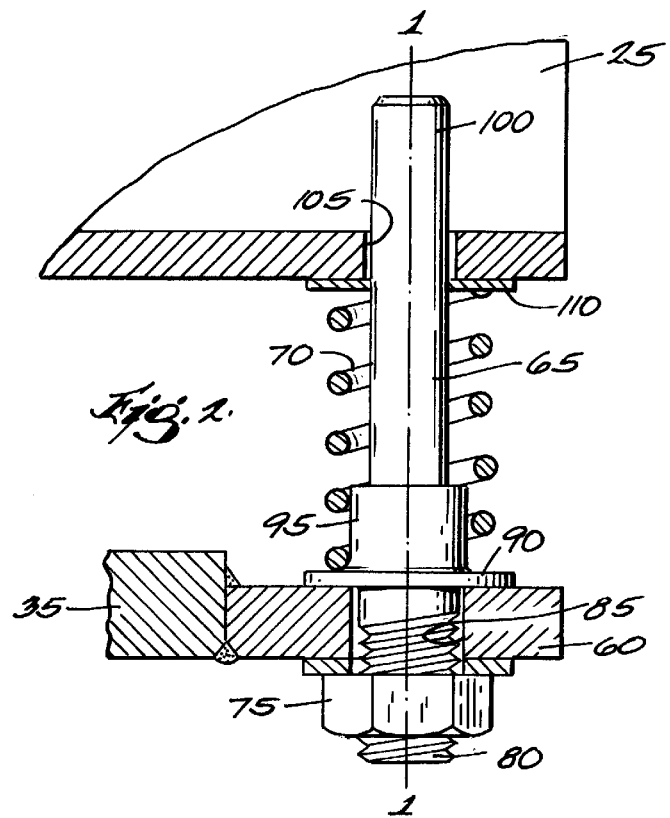
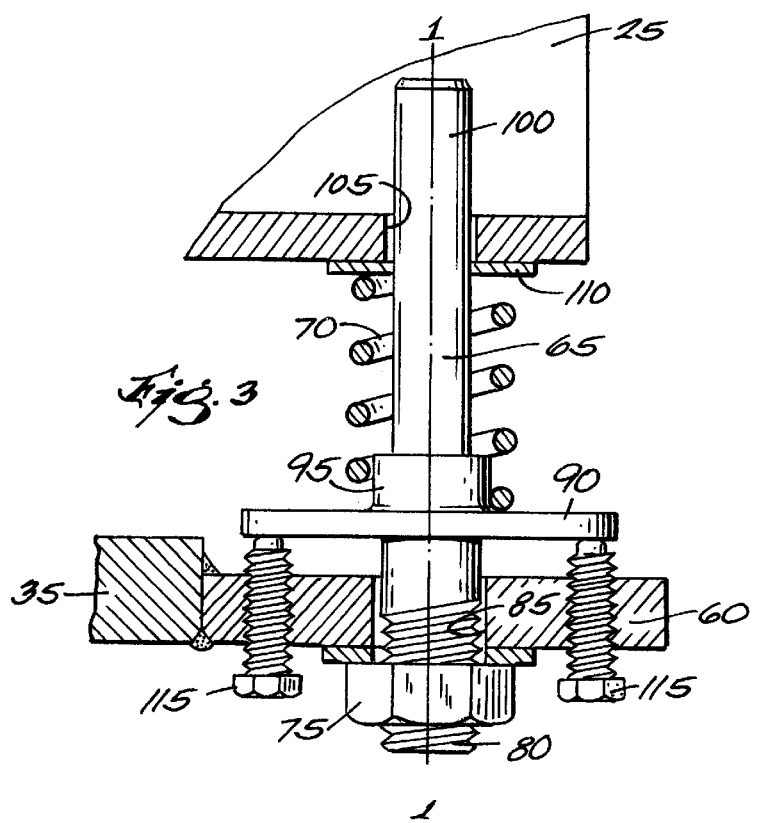

SPRING MOUNTED RECUPERATOR

FIELD OF THE INVENTION

The invention relates generally to microturbine systems for use in power generation and more specifically to microturbine systems having a recuperator mounted directly above a turbine.

BACKGROUND OF THE INVENTION

Microturbine systems of the type described herein are used to generate electricity and heat for small or limited applications. A recuperated microturbine system includes a turbine, which feeds hot exhaust gas to a recuperator. The recuperator is a heat exchanger intended to improve the overall efficiency of the microturbine system.

A hot gas flows through the turbine and recuperator during operation. The flow of hot gas causes a substantial temperature increase in the turbine and recuperator. The change in component temperatures causes thermal expansion of the turbine and recuperator. An allowance must be made to accommodate this thermal expansion. A microturbine system that does not reasonably accommodate the thermal expansion of the turbine and recuperator is susceptible to distortion, high stress, and potential component failure. In addition, an adequate seal must be maintained between the turbine and recuperator to avoid the leakage of hot exhaust gas from the turbine. It is therefore important to provide a reliable means of accommodating the thermal expansion without leaking hot exhaust gas.

SUMMARY OF THE INVENTION

The present invention provides a support structure for the recuperator. The support structure includes a plurality of spring supports that permit thermal expansion between the turbine and recuperator.

The microturbine system includes a frame, a recuperator, and a turbine having a central axis, a mounting end coupled to the frame, and an exhaust end coupled to the recuperator. A plurality of springs are coupled to the frame and support the recuperator. Expansion or contraction of the turbine causes the recuperator to move in a direction parallel to the turbine central axis.

The plurality of spring supports include the springs, and a post coupled to the frame, the post having a longitudinal axis. The spring has a center axis substantially collinear with the post longitudinal axis, and a first end coupled to the frame. The spring has a second end in supporting contact with the recuperator. The spring supports allow thermal expansion to occur without creating high stress in the turbine or unduly restricting turbine movement. Thermal expansion of the turbine causes the turbine to lift the recuperator, partially de-compressing the springs.

Other features and advantages of the invention will become apparent to those skilled in the art upon review of the following detailed description, claims, and drawings.

BRIEF DESCRIPTION OF THE DRAWINGS

FIG. 2 is a detailed view of a single spring support.

FIG. 3 is a detailed view of a single spring support that is adjustable in the vertical direction along axis 1-1.

DETAILED DESCRIPTION OF THE PREFERRED EMBODIMENTS

Figure 1:
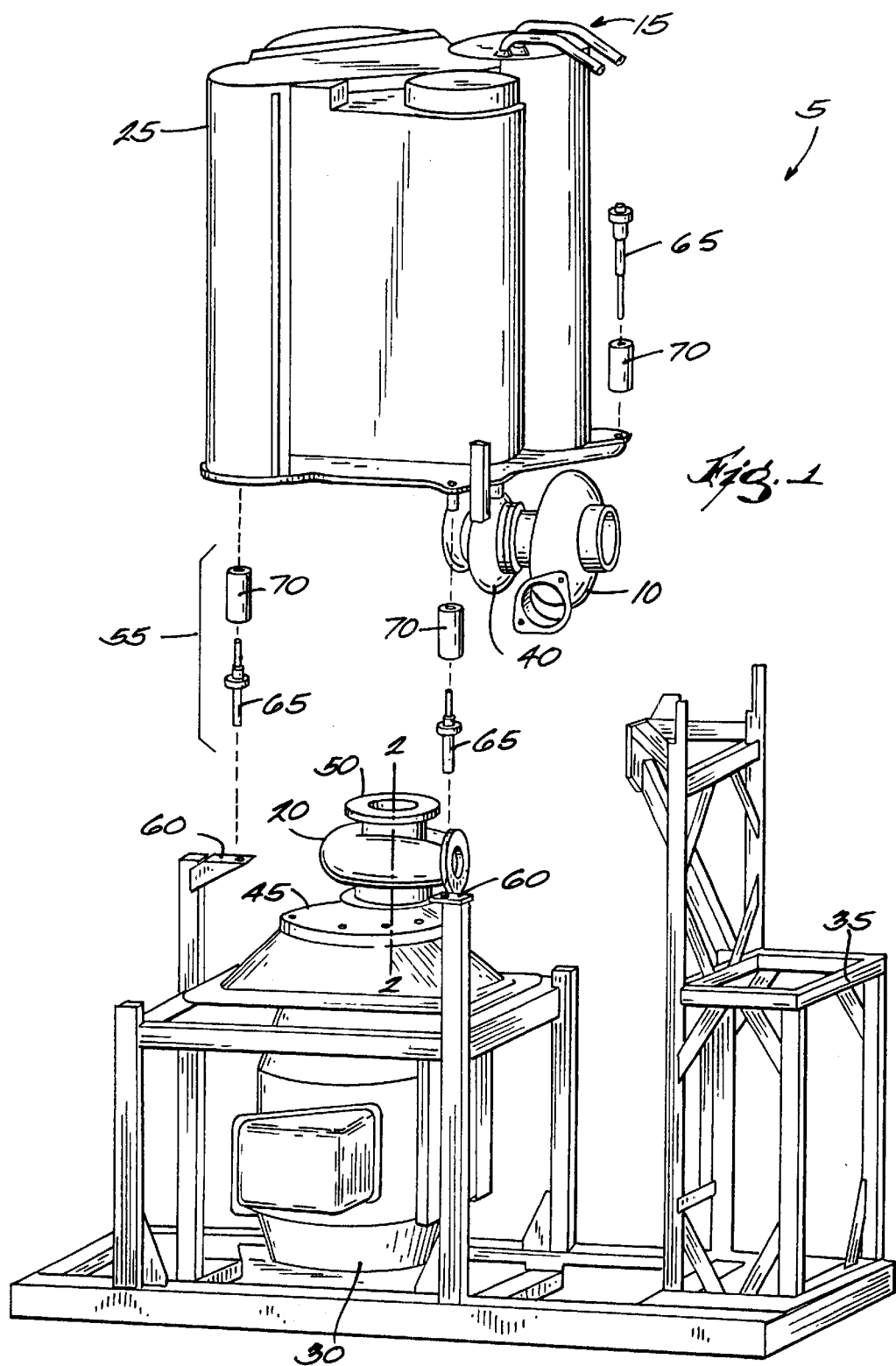
FIG. 1 is an exploded view of a vertically mounted recuperator supported by spring supports.

FIG. 1 illustrates a microturbine system 5 including a compressor 10, a combustion section 15, a turbine 20, a recuperator 25, a generator 30, and a frame 35. While many arrangements of these components are possible, the invention relates to systems having the recuperator 25 mounted in a position directly above the turbine 20 as shown in. FIG. 1. The system frame 35, constructed of steel or other known materials, should be capable of rigidly supporting the components of the system 5. The generator 30, which is attached to the frame 35, produces an electrical power output at the desired voltage and frequency when driven by the turbine 20. A rigid attachment of the generator 30 to the frame 35 is possible using bolts, screws, or other known methods of attachment. The generator 30 has a drive shaft that extends beyond the generator frame to a point where it can be coupled to the turbine shaft or other drive apparatus.

The compressor 10 is generally a single stage radial flow compressor of known design, driven either directly or indirectly by the turbine 20. The compressor 10 draws in atmospheric air along its central axis, compresses the air to a pressure in the range of 3 to 5 atmospheres, and then discharges the compressed air. From the compressor 10, the air flows through the cold side of the recuperator 25 to the combustion section 15.

In the combustion section 15, air and fuel are mixed. Ignition of the fuel-air mixture within the combustion section 15 produces an increase in temperature and gas volume. By controlling the fuel flow to the combustion section 15, the system 5 is capable of maintaining a desired power output and turbine exhaust gas temperature. The hot exhaust gases, or products of combustion, exit the combustion section 15 and flow to the turbine 20.

In the turbine 20, the products of combustion expand, imparting rotational energy to the turbine's rotating element. The rotating element, in turn drives the compressor 10 and the generator 30. The turbine 20 is typically a single stage, radial flow turbine of known design capable of operating in the microturbine environment. The hot gas flowing through the turbine 20 is capable of reaching temperatures in excess of 1000° F. This hot exhaust gas then flows through the diffuser to the hot side of the recuperator 25. The diffuser allows the gas to expand while reducing its flow velocity before entering the recuperator 25. While a system 5 having one turbine 20 has been described, a system 5 having two turbines is within the scope of the invention. In a two-turbine system, the first turbine 40, the gasifier turbine, is typically coupled to the compressor 10. Products of combustion leaving the combustion section 15 enter the first turbine 40, expand, and drive the compressor 10. The gas exits the first turbine 40 and enters the second turbine 20. The second turbine 20, the power turbine, is typically coupled to the generator 30. The hot gas expands in the second turbine 20, imparting energy to the rotating shaft, which in turn drives the generator 30 to generate electricity. The gas leaving the second turbine 20 flows through the diffuser to the hot side of the recuperator 25 as previously described.

Virtually any form of recuperator 25 may be used in the microturbine system 5, provided the recuperator 25 is able to withstand the internal pressures created by the compressed air, and the temperatures of the exhaust gases. A preferred recuperator 25, however, is a plate-fin counterflow type recuperator 25 having separate flow paths for the compressed air and the exhaust gases. The heat from the exhaust gases is transferred to the compressed air to preheat the compressed air prior to it being fed to the combustion section 15. Heat transfer fins are used within the recuperator 25 to increase the efficiency of the heat transfer from the exhaust gases to the compressed air. Preheating the compressed air increases the efficiency of the system 5.

The turbine 20 has a mounting end 45 and an exhaust end 50. The mounting end 45 attaches to the frame 35 in a manner that allows coupling of the generator drive shaft and the turbine shaft. In other embodiments, a gearbox employed between the turbine 20 and the generator 30 allows the turbine 20 to rotate at a different speed than the generator 30. In the embodiment illustrated in FIG. 1, the turbine 20 bolts to the frame 35 using a mounting flange. A similar mounting flange couples the turbine exhaust end 50 to the recuperator 25. The use of a rigid flange on both sides of the turbine 20 provides for a firm attachment to the frame 35 and a superior seal between the turbine 20 and the recuperator 25 reducing the likelihood of exhaust gas leakage. However, the use of a rigid attachment prevents relative movement between the turbine 20 and recuperator 25. To allow for thermal expansion, the recuperator 25 mounts to the frame 35 using several spring supports 55.

A plurality of mounting points 60 located on the frame 35 support the spring supports 55, which in turn support the recuperator 25. Each spring support 55 has a post 65, a spring 70 and a nut 75 or other restraining device holding the post 65 in place. The number and placement of the spring supports 55 is dependent on the overall system design. For example, a larger and therefore heavier recuperator 25 may require more supports 55 to distribute the weight evenly throughout the frame 35. A recuperator 25 having a non-rectangular shape may require supports 55 at positions other than the corners.

FIG. 2 shows an embodiment of a single spring support 55 attached to the frame 35 and supporting the recuperator 25. The post 65 performs several functions in the spring support 55. First, the post 65 attaches the spring support 55 to the frame 35. The post 65 of FIG. 2 has an attachment region 80 threaded to accept the nut 75. A hole 85 in the frame 35 receives the post 65, the nut 75 then threads onto the post 65 firmly holding it in place. Second, the post 65 supports the spring 70. The spring 70 rests on a large diameter portion or collar 90 located adjacent the attachment portion 80. The collar 90 supports the spring 70 and protects the frame 35 from any potential damage caused by movement or compression of the spring 70. If the spring 70 were to cause damage, the post 65 could be repaired or replaced rather than repairing the frame 35. In addition to supporting the spring 70, the collar 90 prevents the post 65 from falling through the hole 85 in the frame 35. The collar 90 provides a surface opposite the nut 75 that allows the post 65 to clamp to the frame 35, firmly coupling the post 65 to the frame 35. Third, the post 65 provides a spring guide portion 95 for guiding the spring 70. Adjacent the collar 90 is the spring guide portion 95 having a diameter slightly smaller than the inside diameter of the spring 70. The spring guide portion 95 acts as a spring guide maintaining the spring's concentric arrangement with the post 65. Finally, the post 65 provides a recuperator guide portion 100 for guiding the recuperator 25. The recuperator guide portion 100 extends some distance through an opening or hole 105 in the recuperator 25 allowing the recuperator 25 to move vertically, parallel to the post axis 1-1, while preventing substantial movement in all directions perpendicular to the post axis 1-1. The hole 105 within the recuperator 25 must be larger than the recuperator guide portion 100 to accommodate thermal growth. Holes 105 that are 3/16 to 3/8 of an inch larger than the recuperator guide portion 100 provide adequate room for thermal expansion while preventing excessive lateral movement. The post 65 is manufactured as one piece containing the attachment region 80, collar 90, spring guide portion 95, and recuperator guide portion 100. The post 65 can be manufactured from alloy steel, stainless steel, other metals, or composites and the like. While the post 65 is generally turned or machined from a single piece of material, other known manufacturing processes such as casting, forging, welding and the like can be employed to manufacture the post 65.

As previously mentioned, thermal expansion of the recuperator 25 causes lateral movement of the recuperator 25 relative to the spring supports 55. This lateral movement can cause binding, scratching, or gauling of the recuperator 25 and the spring 70. To reduce the potential damage caused by the lateral movement, a spring disk 110 can be placed between the spring 70 and the recuperator 25. The spring disk 110 if damaged could be easily replaced without requiring repairs to the recuperator 25. The spring supports 55, however, will function adequately with or without spring disks 110.

Compression springs 70, placed over the posts support the weight of the recuperator 25. Each compression spring 70 has two flat ends approximately parallel to one another to assure that the recuperator 25 is properly supported. The quantity of spring supports 55 used, along with the spring constants of the individual springs 70, are design considerations that are critical in assuring adequate support for the recuperator 25 while maintaining minimum forces on the turbine 20. It is desirable to use the smallest spring constant possible, however a small spring constant will require very large spring deflections or more spring supports 55 to support the weight of the recuperator 25. Therefore, springs 70 having a spring constant between 100 pounds per inch (lbs/in) and 300 lbs/in are most desirable. The use of spring constants outside of the most desirable range can function with the invention but may require additional support points, or may apply a load to the turbine that is greater than necessary.

By using spring supports 55, the turbine 20 no longer needs to move the entire weight of the recuperator 25 during thermal expansion. Rather, the turbine 20 must move only that portion of weight equal to the effective spring constant multiplied by the total amount of thermal expansion. The effective spring constant is the sum of the spring constants of all the springs 70. For example, a microturbine system 5 using four spring supports 55, each support having a spring 70 with a spring constant of 160 lbs/in would have an equivalent spring constant of 640 lbs/in. If the turbine 20 expands in response to the hot gas flow, 1/8 inch, the recuperator 25 which is coupled to the turbine and supported by the spring supports, must be moved 1/8 inch. The force applied to the turbine 20 would equal the effective spring constant, 640 lbs/in, multiplied by the distance moved, 1/8 inch. The result is a force of only 80 pounds. The 80-pound force in this example is well within the capabilities of known turbines 20 operating at full temperature. In contrast, recuperators 25 weighing 1000 pounds or more, supported such that the turbine 20 is required to move the entire weight of the recuperator 25 could severely stress the turbine 20. The above example further illustrates the importance of choosing the number of spring supports 55 and the individual spring constants properly. As one can see, the addition of another spring support 55 would increase the effective spring constant, thus increasing the force applied to the turbine 20 during expansion. Increasing the spring constant of the springs 70 would have the same undesirable effect.

The actual weight supported by the spring supports 55 varies with the temperature of the turbine 20. As shown in FIG. 1, the turbine 20 is attached to the frame 35 using a series of bolts thus achieving a rigid connection. Generally, the recuperator 25 is placed on the plurality of spring supports 55 after the turbine 20 has been attached to the frame 35. As the springs 70 compress, more weight is supported by the springs 70 until, the springs 70 totally support the recuperator 25, or the recuperator 25 contacts the turbine 20. When the springs 70 totally support the recuperator 25, it is likely that the mounting flanges of the turbine 20 and the recuperator 25 are spaced apart some distance. If this is the case, attachment of the turbine 20 to the recuperator 25 would further compress the springs 70 increasing the total weight supported by them. In fact, the springs 70 would actually be supporting the total weight of the recuperator 25 and a preload amount determined by the effective spring constant and the distance between the flanges, prior to the attachment of the turbine 20. If the recuperator 25 contacts the turbine 20 before the springs 70 support the entire weight of the recuperator 25, the turbine 20 will support a portion of the recuperator weight. In this situation, the spring supports 55 along with the turbine 20 support the entire weight of the recuperator 25. While it is possible to support the recuperator 25 entirely without applying a preload to the springs 70, this situation is very unlikely. The many variables involved make it difficult to place a recuperator 25 on a plurality of spring supports 55 such that the recuperator 25 is fully supported by the springs 70 and in contact with the turbine flange but applying no load thereto.

Because of the many variables involved and the desire to consistently support the recuperator without applying a load to the turbine, vertical adjustment of the spring supports may be necessary. FIG. 3 shows an embodiment of a spring support having a plurality of jackscrews 115. The jackscrews 115 allow the vertical adjustment of the individual supports 55. By adjusting the supports 55, it is possible to assemble the system 5 with no preload on the turbine 20, or to preload the turbine 20 with either a compressive or a tensile load, as desired. For example, it may be desirable to apply a preload to the springs 70 rather than allow the turbine 20 to support some of the recuperator weight. If the turbine 20 supports some of the recuperator weight during assembly of the microturbine system 5, the weight supported by the turbine 20 will increase as the turbine 20 heats and expands. If on the other hand, the spring supports 55 are preloaded such that the spring supports 55 are actually applying a tensile force to the turbine 20 during assembly, thermal expansion will tend to reduce the existing force on the turbine. As the turbine 20 expands, the force will reduce, potentially to zero, or to a point where the turbine 20 supports some of the recuperator weight. By choosing the preload carefully, the force applied to the turbine 20 can be minimized when the turbine 20 is at its highest temperature, lowest temperature, or for that matter any temperature. The desired spring preload is easily achieved by adjusting the jackscrews 115 until a desired gap between the recuperator and turbine exists. Attachment of the turbine 20 to the recuperator 25 further compresses the springs 70 an amount equal to the desired gap left between the turbine 20 and recuperator 25. The additional spring compression applies a tensile preload to the turbine 20. In a preferred embodiment, the desired gap is zero and no preload is applied to the turbine 20.

Although particular embodiments of the present invention have been shown and described, other alternative embodiments will be apparent to those skilled in the art and are within the intended scope of the present invention. Thus, the present invention is to be limited only by the following claims.

What is claimed is:
1. A microturbine comprising:
a frame;
a recuperator having heat exchange cells and exhaust gas flow regions between said heat exchange cells;
an air compressor in fluid communication with said heat exchange cells for the delivery of compressed air thereto;
a combustor in fluid communication with said heat exchange cells for the delivery of the compressed air from said cells to said combustor, said combustor burning fuel with the compressed air to create products of combustion;
a turbine in fluid communication with said combustor to receive the products of combustion therefrom, said turbine operating in response to the flow of products of combustion, said turbine including an exhaust gas outlet through which used products of combustion flow out of said turbine as exhaust gas; and
a plurality of springs coupled to said frame and coupled to said recuperator, said recuperator being at least partially supported by said springs and coupled to the turbine;
wherein said turbine expands in a thermal expansion direction in response to said flow of products of combustion therethrough, wherein said turbine lifts said recuperator as said turbine expands in said thermal expansion direction, and wherein the weight carried by said turbine during such thermal expansion is less than the weight of said recuperator due to said recuperator being at least partially supported by said springs.

2. The microturbine of claim 1, wherein each of said springs is characterized by a spring constant, wherein the sum of all of said spring constants is equal to an effective spring constant, and wherein the weight carried by said turbine due to said thermal expansion during such thermal expansion is about equal to said effective spring constant multiplied by the extent of thermal expansion of said turbine in said thermal expansion direction.

3. The microturbine of claim 1, further comprising a post, having a longitudinal axis, the post coupled to the frame, and said spring having a center axis substantially collinear to the post longitudinal axis, the spring having a first end in supporting contact with the post and a second end in supporting contact with the recuperator.

4. The microturbine of claim 1, wherein each of said springs has a spring constant between 50 pounds per inch and 500 pounds per inch.

5. The microturbine of claim 1, further comprising:
a spring disk located between the recuperator and a spring end such that the second spring end is in supporting contact with the spring disk and the spring disk is in supporting contact with the recuperator.

6. The microturbine of claim 1, wherein when said turbine thermal expansion is equal to an equilibrium thermal expansion no force is applied between said turbine and said recuperator and the recuperator is supported solely by said springs.

7. The microturbine of claim 1, wherein said turbine is expandable and contractible between a minimum turbine thermal expansion and a maximum turbine thermal expansion, and wherein said turbine is expandable an amount equal to an equilibrium thermal expansion between said minimum thermal expansion and said maximum thermal expansion, wherein when said turbine thermal expansion is between said equilibrium and said maximum, said turbine and said plurality of springs totally support said recuperator, and when said turbine thermal expansion is between said minimum and said equilibrium, said plurality of springs totally support said recuperator and support a preload amount which further compresses the springs, and when said turbine thermal expansion is equal to said equilibrium, said plurality of springs totally support said recuperator while said preload amount is equal to zero.

8. The microturbine of claim 1, wherein said turbine is expandable and contractible between a minimum turbine thermal expansion and a maximum turbine thermal expansion, wherein when said turbine thermal expansion is greater than said minimum thermal expansion, said turbine and said plurality of springs totally support said recuperator, and when said turbine thermal expansion is equal to said minimum thermal expansion, said plurality of springs totally support said recuperator.

9. The microturbine of claim 1, further comprising a plurality of jackscrews corresponding to the plurality of springs, each jackscrew coupled to the frame and coupled to the spring such that rotation of the jackscrew moves the spring along an axis substantially parallel to said thermal expansion direction.

10. A method of supporting a recuperator in a microturbine system having a frame, a combustor, and a turbine, the method comprising:

coupling a plurality of posts to the frame, said posts having substantially vertical central axis;

placing at least one spring over each of said plurality of posts such that the central axis of said at least one spring is substantially collinear with the post vertical central axis, said springs having a first end and a second end, said first end coupled to the frame;

placing the recuperator on the plurality of springs such that the second end of the springs is coupled to the recuperator and the springs compress, at least partially supporting the recuperator; and coupling the turbine to the recuperator and to the frame, said turbine having a minimum amount of thermal expansion, a maximum amount of thermal expansion and an equilibrium amount of thermal expansion between said minimum amount of thermal expansion and said maximum amount of thermal expansion, at said equilibrium amount of thermal expansion said plurality of springs totally support said recuperator;

said turbine thermally expanding in response to the flow of products of combustion therethrough;

such that said turbine expansion, when between said equilibrium and said maximum, lifts said recuperator a distance, uncompressing said springs an equal distance, such that the plurality of springs and the turbine support the recuperator, and said turbine expansion, when between said minimum and said equilibrium, pulls said recuperator down a distance, further compressing said springs an equal distance, such that the plurality of springs totally support the recuperator and a preload.

* * * * *